US011398639B2

(12) United States Patent
Bettey et al.

(10) Patent No.: US 11,398,639 B2
(45) Date of Patent: Jul. 26, 2022

(54) SYSTEM AND METHOD FOR THE MANUFACTURE OF MEMBRANE ELECTRODE ASSEMBLIES

(71) Applicant: JOHNSON MATTHEY FUEL CELLS LIMITED, London (GB)

(72) Inventors: John Bettey, Cambridge (GB); Richard Cunliffe, Cambridge (GB); Stewart Huxley, Cambridge (GB); Lee Alan Sweetland, Swindon (GB)

(73) Assignee: Johnson Matthey Fuel Cells Limited, London (GB)

( * ) Notice: Subject to any disclaimer, the term of this patent is extended or adjusted under 35 U.S.C. 154(b) by 66 days.

(21) Appl. No.: 16/312,384

(22) PCT Filed: Jun. 27, 2017

(86) PCT No.: PCT/GB2017/051866
§ 371 (c)(1),
(2) Date: Dec. 21, 2018

(87) PCT Pub. No.: WO2018/002598
PCT Pub. Date: Jan. 4, 2018

(65) Prior Publication Data
US 2019/0237788 A1 Aug. 1, 2019

(30) Foreign Application Priority Data

Jun. 28, 2016 (GB) ..................................... 1611174

(51) Int. Cl.
*H01M 8/1004* (2016.01)
*B32B 38/00* (2006.01)
(Continued)

(52) U.S. Cl.
CPC ........... *H01M 8/1004* (2013.01); *B32B 27/12* (2013.01); *B32B 37/12* (2013.01); *B32B 37/223* (2013.01);
(Continued)

(58) Field of Classification Search
CPC . H01M 8/1004; B25J 9/0093; B32B 38/0004; B32B 2308/1891
See application file for complete search history.

(56) References Cited

U.S. PATENT DOCUMENTS 2,492,908 A * 12/1949 Von Hofe ............. B65C 9/1826
156/538
2007/0116999 A1 5/2007 Kuramochi et al.
(Continued)

FOREIGN PATENT DOCUMENTS

CN 2001236971 A 8/2001
CN 101103476 A 1/2008
(Continued)

OTHER PUBLICATIONS

PCT/GB2017/051866 International Search Report dated Oct. 26, 2017.
(Continued)

*Primary Examiner* — Michael A Tolin
*Assistant Examiner* — Christopher C Caillouet
(74) *Attorney, Agent, or Firm* — BakerHostetler

(57) ABSTRACT

The present invention provides a system for the manufacture of membrane electrode assemblies, comprising: a first carriage traversable along a first track, the first carriage having a support platform; a second carriage traversable along a second track, the second carriage having a support platform; sheet supplying means for supplying sheets comprising a gas diffusion layer onto the support platforms of the carriages; and supply means for supplying a continuous web compris-
(Continued)

ing an ion-conducting membrane between at least a portion of the first and second tracks, wherein the system is arranged to align the first and second carriages either side of the continuous web with the support platforms of the first and second carriages facing the continuous web, whereby the system is suitable for adhering sheets carried thereby to opposite sides of the continuous web in an aligned configuration.

14 Claims, 1 Drawing Sheet

(51) Int. Cl.
*B32B 37/22* (2006.01)
*H01M 4/88* (2006.01)
*B32B 38/18* (2006.01)
*H01M 8/0297* (2016.01)
*B32B 27/12* (2006.01)
*B32B 37/12* (2006.01)
*H01M 8/10* (2016.01)

(52) U.S. Cl.
CPC ...... *B32B 38/0004* (2013.01); *B32B 38/1833* (2013.01); *B32B 38/1841* (2013.01); *H01M 4/881* (2013.01); *H01M 4/8807* (2013.01); *H01M 8/0297* (2013.01); *B32B 2038/1891* (2013.01); *B32B 2262/106* (2013.01); *B32B 2309/105* (2013.01); *B32B 2327/18* (2013.01); *B32B 2457/18* (2013.01); *H01M 2008/1095* (2013.01); *Y02P 70/50* (2015.11)

(56) References Cited

U.S. PATENT DOCUMENTS

| | | |
|---|---|---|
| 2007/0199474 A1* | 8/2007 | Zamperla ............... A63G 21/20 104/53 |
| 2009/0038747 A1 | 2/2009 | Galiano et al. |
| 2010/0167176 A1 | 7/2010 | Kawai |
| 2011/0280691 A1* | 11/2011 | Yabe ...................... B25J 9/0084 414/222.01 |
| 2014/0080692 A1* | 3/2014 | Lenser .................. B65H 45/22 493/369 |
| 2015/0077023 A1* | 3/2015 | Wernersbach .......... H02P 31/00 318/5 |
| 2015/0151929 A1* | 6/2015 | Aumann ................. B65B 61/20 198/803.3 |

FOREIGN PATENT DOCUMENTS

| | | |
|---|---|---|
| CN | 101740789 A | 6/2010 |
| EP | 0631337 A2 | 12/1994 |
| EP | 1961578 A1 | 8/2008 |
| JP | H01146626 A | 6/1989 |
| JP | 2005135655 A1 | 5/2005 |
| JP | 2005183182 A | 7/2005 |
| JP | 2008166842 A | 7/2008 |
| JP | 2008258097 A | 10/2008 |
| JP | 2010118237 A | 5/2010 |
| JP | 2013251253 A | 12/2013 |
| WO | WO 00/24074 A1 | 4/2000 |

OTHER PUBLICATIONS

PCT/GB2017/051866 Written Opinion dated Oct. 26, 2017.
PCT/GB2017/051866 International Preliminary Report on Patentability dated Sep. 14, 2018.

* cited by examiner

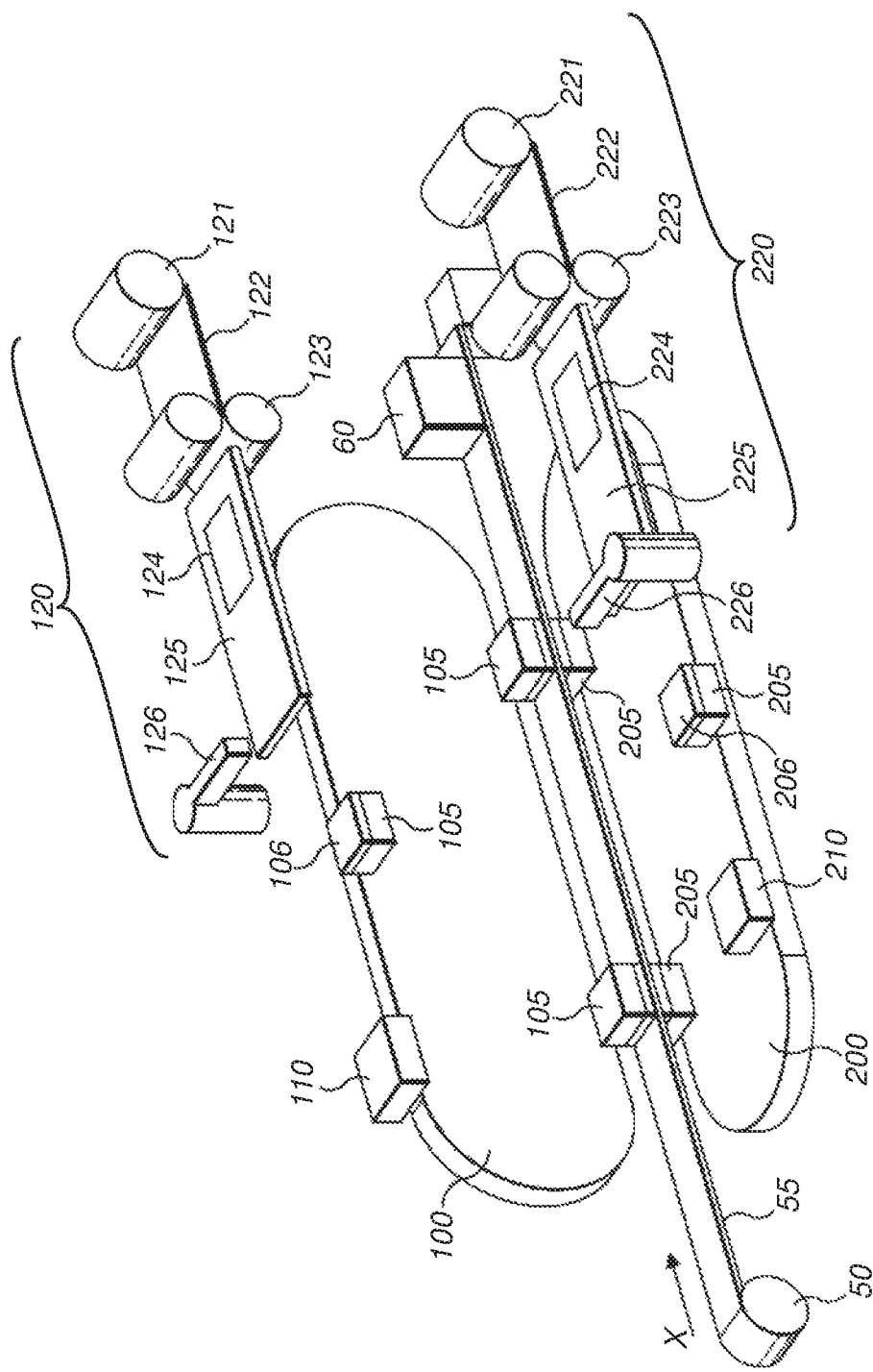

SYSTEM AND METHOD FOR THE MANUFACTURE OF MEMBRANE ELECTRODE ASSEMBLIES

CROSS-REFERENCE TO RELATED APPLICATIONS

This application is the National Stage of International Patent Application No. PCT/GB2017/051866 filed Jun. 27, 2017 which claims priority from Great Britain Patent Application No. 1611174.2, filed Jun. 28, 2016, the disclosures of each of which are incorporated herein by reference in their entireties for any and all purposes.

This disclosure relates to a system and method for the manufacture of membrane electrode assemblies (MEAs), and in particular MEAs for fuel cells. In particular, it relates to a system permitting high speed formation of fully assembled MEAs such as by the attachment of gas diffusion layers (GDLs) to catalyst coated membranes (CCMs).

A fuel cell is an electrochemical cell comprising two electrodes separated by an electrolyte. A fuel, such as hydrogen, or an alcohol, such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In a hydrogen-fuelled or alcohol-fuelled proton exchange membrane fuel cell (PEMFC), the electrolyte is a solid polymeric membrane, which is electronically insulating and proton conducting. Protons, produced at the anode, are transported across the membrane to the cathode, where they combine with oxygen to form water. The most widely used alcohol fuel is methanol, and this variant of the PEMFC is often referred to as a direct methanol fuel cell (DMFC).

The principal component of the PEMFC is known as a membrane electrode assembly (MEA) and is essentially composed of five layers. The central layer is the polymeric ion-conducting membrane. On either side of the ion-conducting membrane there is an electrocatalyst layer, containing an electrocatalyst designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

Typically, the MEA is fabricated by one of two general approaches:
(i) An electrocatalyst layer may be applied to a GDL to form a gas diffusion electrode (GDE). Two GDEs can be placed either side of the ion-conducting membrane and laminated together to form the MEA;
(ii) An electrocatalyst layer may be applied to both faces of the ion-conducting membrane to form a CCM. Subsequently, GDLs are applied to both faces of the CCM.

Typically, a seal component is also positioned around the periphery of the MEA to seal the edges of the porous layers and prevent reactant gas egress and mixing and to reinforce and strengthen the edge of the MEA to protect any exposed membrane edges and to provide a robust surface for the subsequent interfacing with gasket components when the MEA is assembled into the complete fuel cell. The sealing component may be introduced at one or more stages of fabrication of the MEA, such as during fabrication of the CCM, or incorporated into the GDL, or applied to the complete MEA after fabrication. When the sealing component is applied to the CCM or to the GDL it can also provide a further function of facilitating the bonding of the sub-components of the MEA to produce a fully integrated MEA.

Most MEA fabrication methods for integrating the GDL into the MEA rely on bonding the sub-components together by a process involving the bringing together of the components at elevated temperature and pressure and holding for a specific period of time that is sufficient to effect a durable and long-lasting bond between the components. Such a hot-bonding or thermo-compression process also relies on the presence of a bonding promotor, or adhesive, to be present. The adhesive is typically incorporated with the seal component in the form of a thin layer of a hot-melt adhesive on the surface of the seal component. In an effort to reduce manufacturing costs and increase manufacturing speeds there has been much recent progress made on developing much faster continuous reel-to-reel manufacturing processes for CCMs and MEAs. However, the bonding of the GDL onto the MEA by a thermo-compression step remains a slow process, even if the GDLs are applied in a continuous manner by using, for example, hot nip rollers to apply both the pressure and heat needed for sufficient time to effect a suitable bond.

Accordingly, it is desirable to provide an improved system capable of producing fully integrated MEAs at a much faster rate and also whilst simultaneously providing for a very accurate alignment of the components.

According to a first aspect, the present disclosure provides a system for the manufacture of membrane electrode assemblies, comprising:
a first carriage traversable along a first track, the first carriage having a support platform;
a second carriage traversable along a second track, the second carriage having a support platform;
sheet supplying means for supplying sheets comprising a gas diffusion layer onto the support platforms of the carriages; and
supply means for supplying a continuous web comprising an ion-conducting membrane between at least a portion of the first and second tracks,
wherein the system is arranged to align the first and second carriages either side of the continuous web with the support platforms of the first and second carriages facing the continuous web,
whereby the system is suitable for adhering sheets carried thereby to opposite sides of the continuous web in an aligned configuration.

Optionally, the system further comprises one or more adhesive dispensers for dispensing adhesive onto the sheets carried by the first and second carriages.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The benefit of the system and method may be measured through a much higher manufacturing output rate of fully integrated MEAs. Line speeds of 30 linear m/min can be achieved using the system of the invention to integrate the GDLs into the MEAs compared to typically only around 1-5 linear m/min from conventional continuous manufacturing processes as described above. The benefit can also be measured through the cost of the equipment to achieve this output along with the labour and footprint required for it to operate.

The invention will now be described in relation to the following non-limiting figures, in which:

FIG. 1 shows a schematic of the system described herein.

The system comprises a first carriage 105 traversable along a first track 100, the first carriage having a support platform 106. The system also comprises a second carriage 205 traversable along a second track 200, the second carriage having a support platform 206. The first and second carriages 105, 205 are preferably of substantially the same design. Multiple carriages 105, 205, each having a support platform 106, 206, may be provided on each track 100, 200. The number of first carriages and second carriages is suitably equal. The exact number of first and second carriages will be dependent upon a number of factors, including the size of the system, the size of the MEA to be made etc. and it is within the skilled person's capability to determine the optimum number of carriages.

The system comprises sheet supplying means 120, 220 for supplying sheets 124, 224 comprising a GDL onto the support platforms 106, 206 of the carriages 105, 205. Preferably, the sheet supplying means 120, 220 comprises a first means 120 for supplying sheets 124 positioned above the first track 100 and a second means 220 for supplying sheets 224 positioned above the second track. The sheet supplying means 120, 220 comprises: a spool 121, 221 for unrolling a roll of material comprising GDL to form a strip of material 122, 222 comprising GDL; cutting means 123, 223 for cutting the strip into separate sheets 124, 224 comprising GDL; conveying means 125, 225 for conveying sheets 124, 224 to a pick-and-place robot 126, 226 for accurate placement of the sheets 124, 224 on to the support platform 106, 206 of carriages 105, 205.

The pick-and-place robot 126, 226 has a device for lifting sheets 124, 224 with minimal or no physical contact, thus avoiding potential damage to the sheets 124, 224. Such a device may be a non-contact gripper, for example a Bernoulli Type device. This robot 126, 226 may use a computer vision detection system for accuracy and can place the sheets 124, 224 onto the support platforms 106, 206 on a stationary/slowly moving carriage 105, 205 on the track system. The carriage then accelerates away from the pick-and-place robot and may optionally then have an adhesive dispensed onto the surface of the GDL in the required locations.

Optionally, the system comprises one or more adhesive dispensers 110, 210 for dispensing adhesive onto sheets 124, 224 carried by the first and second carriages 105, 205. Preferably there is at least one adhesive dispenser 110, 210 arranged to apply adhesive for each of the first and second tracks 100, 200. Preferably, the one or more adhesive dispensers 110, 210 comprises a first adhesive dispenser 110 positioned above the first track 100 for depositing adhesive onto sheets 124 carried by the first carriage 105 and a second adhesive dispenser 210 positioned above the second track 200 for depositing adhesive onto sheets 224 carried by the second carriage.

In an alternative embodiment of the system, adhesive dispensers 110, 210 are not present and the sheets 124, 224 have a suitable adhesive pre-applied, and in which the adhesive is pre-applied to the roll of material comprising the GDL before it is cut into the discrete separate sheets 124, 224.

The system comprises supply means 50 for supplying a continuous web 55 comprising ion-conducting membrane between at least a portion of the first and second tracks 100, 200. The supply means 50 may provide a substantially continuous feed of the continuous web 55 in the X direction during normal operation. The X-direction is parallel to a portion of each of the first and second tracks 100, 200. The continuous web 55 may be fed in using roll handling equipment with accurate web steering.

The system is arranged to align the first and second carriages 105, 205 either side of the continuous web 55 with the support platforms 106, 206 of the first and second carriages 105, 205 facing the continuous web 55, whereby the system is suitable for adhering sheets 124, 224 carried thereby to opposite sides of the continuous web 55 in an aligned configuration. The carriages 105, 205 are driven to match the speed of the continuous web 55 and be timed so that they move the sheets 124, 224 into contact with the moving continuous web 55 with high positional accuracy using registration sensors (not shown). The system is capable of achieving a lateral positional accuracy for each GDL attachment of +/−250 µm, whilst effecting the attachment to a continuously moving web at high speed.

Preferably the first and second tracks 100, 200 comprise driving means comprising linear motors for propelling the carriages. Preferably, the driving means of the system that drives the carriages 105, 205 along the tracks 100, 200 can propel each of the carriages at a variable speed. Preferably the driving means is arranged to drive the carriages 105, 205 along the tracks 100, 200 at a lower speed adjacent the adhesive dispensers 110, 210 (if present) than when travelling from the sheet supplying means 120, 220 to the adhesive dispensers 110, 210.

The use of linear motors within a multi-carriage track based system allows for complex operations to be combined which require the carriages to stop, start and move at different speeds independently of each other. This output could not be achieved as effectively using more established robot-driven pick and place techniques.

The use of the system of the invention allows for a fast continuously moving reel-to-reel manufacturing process for attaching the GDLs to form the MEAs with a high positional accuracy which is not necessarily possible with other methods.

A system as described herein, allows much higher fully integrated MEA manufacturing speeds to be achieved. This system is in the form of a track based carriage system which allows placement and bonding of the GDL to a continuous web comprising ion-conducting membrane to be achieved at speeds of around 30 linear m/min.

Preferably the support platform 106, 206 of the first and the second carriages 105, 205 is movable towards and away from the continuous web 55, via a cam mechanism, and the system is thereby arranged to apply pressure between the support platforms 106, 206 when aligned on either side of the continuous web 55 for pressing sheets 124, 224 onto opposite sides of the continuous web 55. The carriages 105, 205 would move with the continuous web 55 and apply pressure to keep the sheets 124, 224 in contact with the continuous web 55 for sufficient time until bonding is achieved.

Preferably the first track 100 forms a loop in a first plane and the second track 200 forms a loop in a second plane and the first and second planes are not parallel. Preferably the first and second planes are perpendicular. In particular, the first and second tracks 100, 200 can be arranged such that the carriages 205 on the second track 200 have an upper surface of support platform 206 which remains in substantially the same orientation as the carriages 105 on the first track 100, such that gravity can be used to apply adhesive to both sheet 124 on support platform 106 and sheet 224 on support platform 206. The carriages on the first track 100 have an upper surface of support platform 106 which is then inverted after adhesive is applied to sheet 124 such that it can then be brought down onto the upper-facing surface of the continuous web 55.

In one embodiment, continuous web 55 has a catalyst layer on both sides thereof (i.e. is a CCM). The catalyst layer may be formed as a continuous coating on either side of the ion-conducting membrane or may be provided as discrete patches of catalyst layer on either side of the ion-conducting membrane.

In an alternative embodiment, sheets 124, 224 each have a catalyst layer thereon applied to the GDL (i.e. is a gas diffusion electrode (GDE)).

Optionally, the continuous web (either comprising catalyst layer or devoid of catalyst layer) may comprise a seal component as described in more detail hereinafter.

According to a further aspect there is provided a method of manufacturing membrane electrode assemblies, comprising the steps of:
  driving a first carriage 105 along a first track 100, the first carriage 105 having a support platform 106;
  driving a second carriage 205 along a second track 200, the second carriage 205 having a support platform 206;
  placing a first sheet 124 comprising a gas diffusion layer onto the support platform 106 of the first carriage 105;
  placing a second sheet 224 comprising a gas diffusion layer onto the support platform 206 of the second carriage 205;
  optionally, dispensing adhesive onto the first and second sheets 124, 224;
  supplying a continuous web 55 comprising an ion-conducting membrane between at least a portion of the first and second tracks 100, 200;
  aligning the first and second carriages 105, 205 either side of the continuous web 55 with the support platforms 106, 206 of the first and second carriages 105, 205 facing the continuous web 55, thereby adhering the first and second sheets 124, 224 to opposite sides of the continuous web 55.

Preferably the method described above can be used in combination with the system described herein. Accordingly, all aspects of the system are disclosed in combination with the method and vice versa.

In more detail, an exemplary method may comprise the following steps:

1) Cutting GDL.

GDL is typically supplied in roll format. The GDL is cut by the cutting means 123, 223 to provide singular sheets 124, 224 comprising GDL, which are transported to the pick-and place robot 126, 226 using conveying means 125, 225. The roll of GDL can be cut into sheets 124, 224 using rotary cutting, laser cutting or similar. Conveying means 125, 225 is suitably a vacuum conveyer.

2) Picking of GDL Pieces

The GDL position is first detected by sensors. Pick and place robot 126, 226 picks up the GDL using a non-contact gripper. An example of such a gripper is based on existing Bernoulli technology for grippers but adapted to be a unique design. This allows the GDL sheet 124, 224 to be held without having any physical contact with the surface. This significantly reduces the risk of damaging the surface of the carbon-fibre based GDL material during handling. The GDL sheet 124, 224 is then placed onto the support platforms 106, 206 of the carriages 105, 205 which are preferably driven by a linear motor system.

3) Transport of the GDL Pieces and Adhesive Application

The carriages 105, 205 then transport the sheets 124, 224 of GDL. The benefit of linear motors is that they can slow down for the placement operation and then speed up to cover distance. Dispensing of the adhesive may then occur at this point onto the top surface of the GDL. If the adhesive requires activation, such as UV activation, this may be carried out at this stage. This step may be omitted if adhesive is pre-applied to the strip of material 122, 222 comprising the GDL before it is cut into sheets 124, 224.

4) Joining of the GDL to form an MEA

Sheets 124, 224 comprising GDL are moved around the track 100, 200 and into contact with a continuous web 55 comprising ion-conducting membrane. The intention of the design is that one linear motors track will be aligned vertically and the other lying in the horizontal plane. This enables both sheets 124, 224 of GDL to be facing upwards for the gravity driven adhesive dispensing process. A CAM movement in the carriages 105, 205 will allow the contact to be made with the web. This will be designed to apply the appropriate amount of force.

5) Bonding Period

The carriages 105, 205 keep the sheets 124, 224 comprising GDL in contact with the continuous web 55 comprising ion-conducting membrane for the required duration for bonding to take place. The required duration is dependent on the adhesive used, but is typically less than 5 seconds. The final MEA product is either cut into discrete parts and stacked at the end of the process or stored as the continuous roll-good product for later processing. For storing as discrete parts, the assembled web is processed through a final cutting station 60 and has dimensional checks completed prior to cutting. For packaging on the roll, a liner film (not shown) is introduced at this stage to support the MEA. The cutting process can still be used but the cutting is only a kiss cut, leaving the liner intact, which then allows the web of integrated MEAs to be rolled up on a spool.

The manufacturing system of the invention has several key features:
  Small footprint of machine
  One vertical and one horizontal track based linear motor system
  Use of a linear motor system to allow for carriages to travel at different speeds
  Suitable for a wide range of sizes of MEA and thus a wide range of MEA products can be produced on the one machine.

Materials

Sheet 124, 224 comprises a gas diffusion layer (GDL). Typical GDLs are suitably based on conventional non-woven carbon fibre gas diffusion substrates such as rigid sheet carbon fibre papers (e.g. the TGP-H series of carbon fibre papers available from Toray Industries Inc., Japan) or roll-good carbon fibre papers (e.g. the H2315 based series available from Freudenberg FCCT KG, Germany; the Sigracet® series available from SGL Technologies GmbH, Germany; or the AvCarb® series available from AvCarb Material Solutions, United States of America, or on woven carbon fibre cloth substrates (e.g. the SCCG series of carbon cloths available from the SAATI Group, S.p.A., Italy. For many PEMFC (including direct methanol fuel cell (DMFC)) applications the non-woven carbon fibre paper, or woven carbon fibre cloth substrates are typically modified with a hydrophobic polymer treatment and/or application of a microporous layer comprising particulate material either embedded within the substrate or coated onto the planar faces, or a combination of both to form the gas diffusion layer. The particulate material is typically a mixture of carbon black and a polymer such as polytetrafluoroethylene (PTFE). Suitably the GDLs are between 100 and 400 µm thick. Preferably there is a layer of particulate material such as carbon black and PTFE on the face of the GDL that contacts the catalyst layer.

The continuous web 55 is an ion-conducting membrane, optionally provided with electrocatalyst material on each side. The ion-conducting membrane may be any membrane suitable for use in a PEMFC, for example the membrane may be based on a perfluorinated sulphonic acid material such as Nafion™ (Chemours Company), Aquivion® (Solvay Specialty Polymers), Flemion™ (Asahi Glass Group) and Aciplex™ (Asahi Kasei Chemicals Corp). Alternatively, the membrane may be based on a sulphonated hydrocarbon membrane such as those available from FuMA-Tech GmbH as the Fumapem® P, E or K series of products, JSR Corporation, Toyobo Corporation, and others. Alternatively, the membrane may be based on polybenzimidazole doped with phosphoric acid which will operate in the range 120° C. to 180° C.

The ion-conducting membrane may comprise one or more materials that confer mechanical strength to the ion-conducting membrane. For example, the ion-conducting membrane may contain a porous reinforcing material, such as an expanded PTFE material or a nanofibre network.

The ion-conducting membrane may comprise one or more hydrogen peroxide decomposition catalysts either as a layer on one or both faces of the membrane or embedded within the membrane. Examples of the hydrogen peroxide decomposition catalyst suitable for use are known to those skilled in the art and include metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides; preferably cerium dioxide (ceria).

The ion-conducting membrane component may optionally comprise a recombination catalyst, in particular a catalyst for the recombination of unreacted $H_2$ and $O_2$, that can diffuse into the membrane from the anode and cathode respectively, to produce water. Suitable recombination catalysts comprise a metal (such as platinum) on a high surface area oxide support material (such as silica, titania, zirconia). More examples of recombination catalysts are disclosed in EP0631337 and WO00/24074.

The ion-conducting membrane may further comprise a seal component applied to one or both sides to seal and/or reinforce the edge of the membrane. The seal component may be applied as a strip along each edge of the membrane on one or both sides, or may be applied as a ladder arrangement on one or both sides.

It is preferred that the manufacturing process is combined with applying adhesives to the sheets comprising GDL which will allow for very fast bonding times to be achieved. Such fast-acting adhesives enable bonding to be achieved in less than 5 seconds, or more preferably, less than two seconds. Preferably the adhesives are pressure sensitive adhesives which are already tacky, or fast curing adhesives such as certain types of cyanoacrylates, epoxies and the like. These adhesives may also have UV curable properties, either designed to act before bonding to produce the pressure-sensitive form of the adhesive, or to promote the bonding characteristics of the adhesive when the GDL is brought into contact with the membrane web.

The use of fast-acting adhesives are a step forward as most prior art currently focuses on hot melt or similar adhesives which are more established but cannot be processed quickly enough for the bonding times required. Finding fast-acting adhesives which can withstand a fuel cell environment is also more challenging as generally they are not as durable.

The inventors have found that certain pressure sensitive adhesives, typically silicone or acrylic based polymer adhesives, and cyanoacrylates and epoxies are suitable. For epoxies this includes types which use UV to rapidly initiate the curing process, and types which have an immediately high green strength to hold the materials together whilst curing occurs over a longer time period. They can achieve the bonding times required and do not have any adverse effects on the fuel cell performance during its lifetime.

Alternatively, it may be possible to employ conventional hot melt adhesives in which case the system and method of the invention will involve a heating step during the bonding process. Although, inherently involving a more time-consuming thermal bonding process, it is still possible to achieve high overall manufacturing rates of 30 linear m/min whilst using hot melt adhesives, with the manufacturing system of the invention, by making the tracks carrying the carriages longer, and adding more carriages to the longer tracks.

The adhesive component can be a fluid or viscous paste able to be deposited or applied onto the GDL. Deposition techniques include, but are not limited, to gravure, slot die, drop deposition, ink-jetting and spraying. The adhesive component can be deposited in the form of beads or droplets, narrow discrete strips, or a continuous coating layer, around the edges of the GDL. The adhesive components when deposited, optionally dried and/or cured and bonded are suitably between 1-20 µm in thickness, and preferably between 1-6 µm in thickness.

Alternatively, suitable adhesives may be provided on the GDL prior to cutting into individual sheets, and in which the adhesive is pre-applied to the roll of material comprising the GDL before it is cut into the discrete individual sheets 124, 224. In this embodiment the optional adhesive dispensers 110, 210 in the system of the invention are not required. In this case the preferred adhesives are conventional hot melt adhesives, or certain pressure sensitive adhesives. Adhesives which cure rapidly into a final state once dispensed, such as the cyanoacrylates and epoxies, are not suitable for pre-application to the roll of GDL material. For pressure sensitive adhesives some curing into a state where they become tacky can occur and these are still suitable for pre-application, if a suitable roll of a releasable liner material is interleaved with the GDL roll prior to dispense of the adhesive.

The catalyst material comprises one or more electrocatalysts. The one or more electrocatalysts are independently a finely divided unsupported metal powder, or a supported catalyst wherein small nanoparticles are dispersed on electrically conducting particulate carbon supports. The electrocatalyst metal is suitably selected from:
  (i) the platinum group metals (platinum, palladium, rhodium, ruthenium, iridium and osmium),
  (ii) gold or silver,
  (iii) a base metal,
  or an alloy or mixture comprising one or more of these metals or their oxides.

The preferred electrocatalyst metal is platinum, which may be alloyed with other precious metals or base metals. If the electrocatalyst is a supported catalyst, the loading of metal particles on the carbon support material is suitably in the range 10-90 wt %, preferably 15-75 wt % of the weight of resulting electrocatalyst.

The exact catalyst material used will depend on the reaction it is intended to catalyse and its selection is within the capability of the skilled person.

Although preferred embodiments of the invention have been described herein in detail, it will be understood by those skilled in the art that variations may be made thereto without departing from the scope of the invention or of the appended claims.

The invention claimed is:

1. A system for the manufacture of membrane electrode assemblies, comprising:
   first carriages traversable along a first track, the first carriages having a support platform, and the first track comprising linear motors that are programmed to propel the first carriages along the first track at variable speeds independently of each other;
   second carriages traversable along a second track, the second carriages having a support platform, and the second track comprising linear motors that are programmed to propel the second carriages along the second track at variable speeds independently of each other;
   sheet supplying means for supplying sheets comprising a gas diffusion layer onto the support platforms of the carriages; and
   supply means for supplying a continuous web comprising an ion-conducting membrane between at least a portion of the first and second tracks,
   wherein the system is arranged to align the first and second carriages either side of the continuous web with the support platforms of the first and second carriages facing the continuous web,
   whereby the system is suitable for adhering sheets carried thereby to opposite sides of the continuous web in an aligned configuration.

2. The system of claim 1, further comprising one or more adhesive dispensers for dispensing adhesive onto sheets carried by the first and second carriages.

3. The system of claim 2, wherein the one or more adhesive dispensers comprises a first adhesive dispenser positioned above the first track for depositing adhesive onto sheets carried by the first carriage and a second adhesive dispenser positioned above the second track for depositing adhesive onto sheets carried by the second carriage.

4. The system of claim 2, wherein the linear motors of the first track are programmed to propel the first carriages along the first track at a lower speed adjacent the one or more adhesive dispensers than when travelling from the sheet supplying means to the one or more adhesive dispensers.

5. The system of claim 4, wherein the linear motors of the second track are programmed to propel the second carriages along the second track at a lower speed adjacent the one or more adhesive dispensers than when travelling from the sheet supplying means to the one or more adhesive dispensers.

6. The system of claim 1, wherein:
   the support platform of the first carriage is movable towards and away from the first track;
   the support platform of the second carriage is movable towards and away from the second track; and
   the system is thereby arranged to apply pressure between the support platforms when aligned on either side of the continuous web for pressing sheets onto opposite sides of the continuous web.

7. The system of claim 1, wherein:
   the first track forms a loop in a first plane;
   the second track forms a loop in a second plane; and
   the first and second planes are not parallel.

8. The system of claim 1, wherein the sheet supplying means comprises a first sheet supplying means for supplying sheets positioned above the first track and a second sheet supplying means for supplying sheets positioned above the second track.

9. The system of claim 1, wherein the sheet supplying means comprises:
   a spool for unrolling a roll of material comprising a gas diffusion layer to form a strip of material comprising a gas diffusion layer; and
   a cutting tool for cutting the strip into separate sheets.

10. The system of claim 1, wherein the sheet supplying means comprises a pick-and-place robot.

11. The system of claim 10, wherein the sheet supplying means further comprises conveying means for conveying the sheet to the pick-and-place robot.

12. The system of claim 1, wherein the linear motors of the first and second tracks are programmed to propel the first and second carriages respectively so that the sheets carried thereby adhere to opposite sides of the continuous web with a positional accuracy of +/−250 μm.

13. The system of claim 1, wherein the linear motors of the first track are programmed to propel the first carriages along the first track such that the first carriages accelerate away from the sheet supplying means.

14. The system of claim 13, wherein the linear motors of the second track are programmed to propel the second carriages along the second track such that the second carriages accelerate away from the sheet supplying means.

* * * * *